United States Patent [19]

Lange et al.

[11] 4,041,123
[45] Aug. 9, 1977

[54] METHOD OF COMPACTING SHAPED POWDERED OBJECTS

[75] Inventors: Frederick F. Lange, Murrysville; Gerald R. Terwilliger, Pittsburgh, both of Pa.

[73] Assignee: Westinghouse Electric Corporation, Pittsburgh, Pa.

[21] Appl. No.: 317,878

[22] Filed: Dec. 22, 1972

Related U.S. Application Data

[63] Continuation of Ser. No. 135,642, April 20, 1971, abandoned.

[51] Int. Cl.² ............................................. C04B 35/60
[52] U.S. Cl. ................................. 264/332; 264/338; 75/226
[58] Field of Search .................. 264/313, 332; 75/226

[56] References Cited

U.S. PATENT DOCUMENTS

| | | | |
|---|---|---|---|
| 2,990,602 | 7/1961 | Brandmayr et al. | 264/332 |
| 3,221,365 | 12/1965 | Mattern et al. | 264/332 |
| 3,279,917 | 10/1966 | Ballard et al. | 264/332 |
| 3,284,195 | 11/1966 | Googin et al. | 264/332 |

FOREIGN PATENT DOCUMENTS

| | | | |
|---|---|---|---|
| 970,639 | 9/1964 | United Kingdom | 264/332 |

OTHER PUBLICATIONS

R. P. Levey, "Isostatic Hot Pressing," June 9, 1965, Contract W-7405-Eng-26 with U.S. Atomic Energy Commission. Work done at Union Carbide Corp.

*Primary Examiner*—Robert F. White
*Assistant Examiner*—James R. Hall
*Attorney, Agent, or Firm*—R. T. Randig

[57] ABSTRACT

A method for densifying to near theoretical density a shaped body of compacted powdered particles, particularly of a refractory material, by preforming a shaped body of compacted particles of a powdered material characterized by voids, enclosing the shaped body within a loose mass of a pressure-transmitting powder disposed within a confining mold, applying a unidirectional pressure to the pressure-transmitting powder within the mold in order to compress the shaped body more compactly while heating the body to at least the densification temperature of the body, preferably in a controlled atmosphere, the temperature and/or pressure being increased incrementally up to the densification temperature of the refractory material, whereby substantially all voids within the compacted shaped body are collapsed.

8 Claims, 1 Drawing Figure

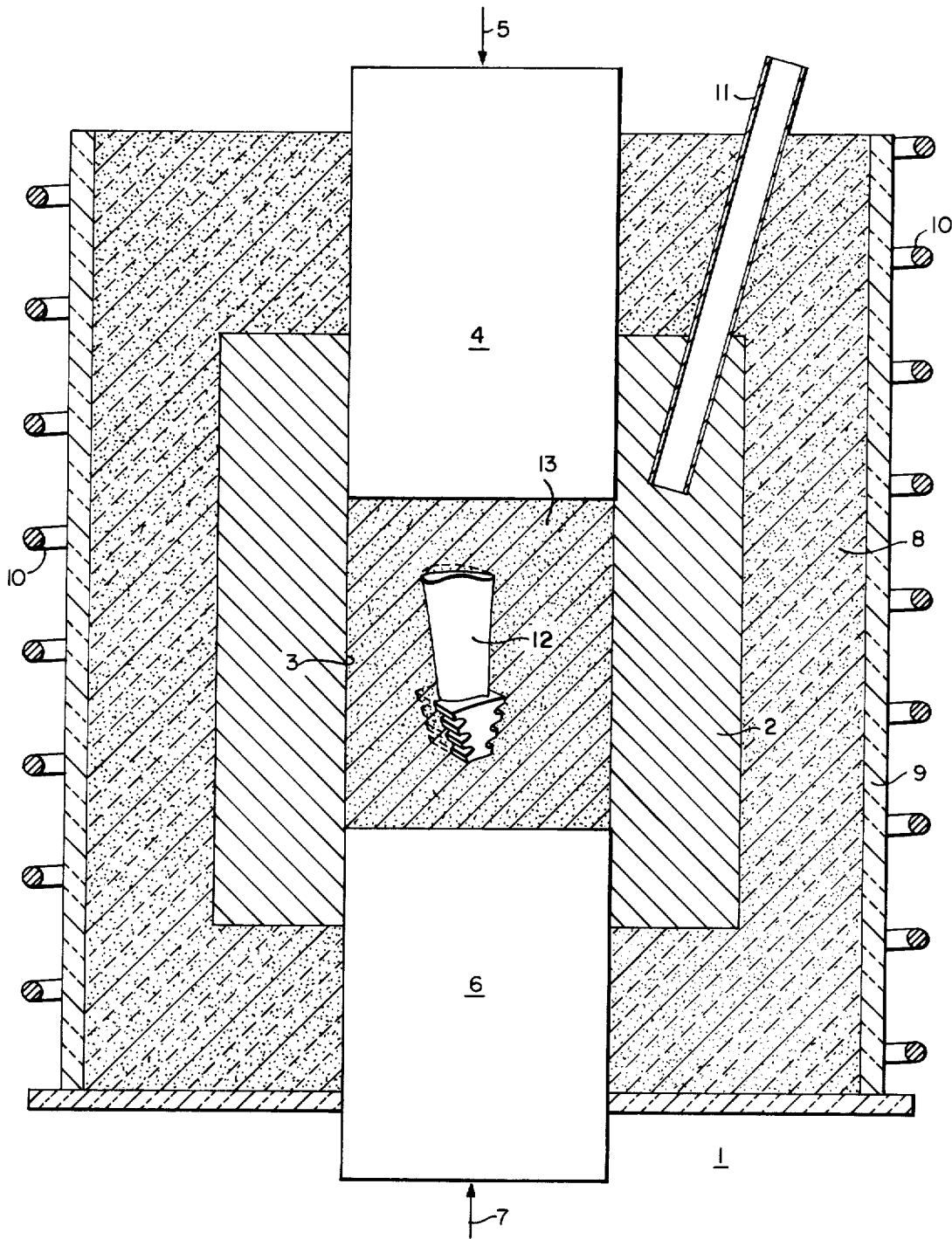

METHOD OF COMPACTING SHAPED POWDERED OBJECTS

CROSS REFERENCE TO RELATED APPLICATION

This is a continuation of application Ser. No. 135,642, filed Apr. 20, 1971, now abandoned.

This application is related to pending application Ser. No. 132,378, filed Apr. 18, 1971 now Pat. No. 3,699,642.

BACKGROUND OF THE INVENTION

1. Field of the Invention

This invention relates to a method for compressing a shaped body of compacted powder, especially of a refractory material, into a more compact body that is substantially free of voids and closely approaches theoretical density.

2. Description of the Prior Art:

Techniques have been developed for the isostatic compaction of objects prepared from powders of various materials including metals and ceramics. These techniques have varied with the characteristics of the material under consideration as well as other factors. Isostatic compaction is the application of pressure uniformly on all sides of an object to obtain uniformly dense components. For example, isostatic compaction has been useful in the fabrication of many types of components in powder metallurgy. Ordinarily, for cold compaction, the powders to be compacted have been placed in a flexible container which is immersed in a fluid and then pressure is applied to the fluid to achieve isostatic densification of the powder body.

More recent techniques of isostatic hot-pressing have involved placing a powdered metal to be densified in a deformable metal jacket. The cladded metal powder is then hot-pressed by means of hot, high pressure gases. These presses require large high pressure cylinders and take considerable time to open, close and to operate.

The primary disadvantage of prior techniques, using piston type compaction of powders, has been their limitation to the production of compacted powdered articles of simple constant or symmetrical cross-sectional area, such as spheres, rods, discs, and plates.

Associated with the foregoing has been the difficult problem of producing high density forms of ceramic materials of a desired complex shape. The superiority of densified ceramic materials is so significant that if such materials were available, they could be used for many applications where other materials such as metals have proven unsatisfactory or have a short life. Accordingly, there has been a need for a method of hot-pressing refractory powdered materials into bodies of complex configuration and with a high density. For example, the ceramic material, silicon nitride ($Si_3N_4$), if suitably fabricated, is useful for high temperature gasturbine blades. Also, if suitable processes were available, other materials, such as silicon carbide (SiC), as well as many powdered refractory metals, such as tungsten, could be processed from a conventional powder compact into high density, void-free forms with complex or asymmetric configurations at reasonable cost.

The term "complex shape" as applied to a shaped body being processed in accordance with this invention, denotes a body whose cross-sections vary markedly and/or irregularly as successive horizontal planes are passed through the body in a direction perpendicular to the application of the unidirectional pressure in a press carrying out the method of this invention. Usually, such complex shaped bodies will be longer in one dimension than in any other, and the bodies will be placed in the confined pressure-transmitting powder in a direction parallel to the application of the unidirectional pressure. It will be understood that, while the method of this invention gives unexpected and outstanding results with complex shaped bodies, the invention obviously can be applied with good results to simple or symmetrically shaped bodies.

A publication entitled "Isostatic Hot Pressing" by R. P. Levey (dated June 9, 1965, as a result of work done at Union Carbide Corporation under Contract W-7405-eng-26 with the U.S. Atomic Energy Commission) discloses briefly on page 8 thereof the following hot-pressing process:

"One method of accomplishing the hot press in solid media has been developed at Y-12. The operation employs conventional graphite dies filled with graphite powder. The part to be pressed is buried in the powder and pressed. Since the specimen pressure is applied through a powder medium, it is more uniform than if directly applied from a piston. The efficiency of pressure generation in the radial direction has not been studied. The ceiling pressure available is about 3000 psi."

It will be apparent that this work comprises only a few tests at most or only a single experiment on some undesignated part, with no indication of how the pressing and heating was carried out. No statement of the nature of the end result or what benefit, if any, was secured is set forth.

Compaction of an object of a powdered material by applying pressure unidirectionally to the body has been limited to compaction in rigid metal dies. The final product is an axially deformed member.

Summary of the Invention

It has been found in accordance with this invention that the foregoing disadvantages may be overcome by the steps of providing an initial preformed body of compacted powder of a desired configuration, but having a porosity or voids or spaces such that its density is less than that of the desired final product, enclosing the preformed body within a powder vehicle which body and powder vehicle are together enclosed within a confining mold, heating the powdered vehicle and body to the densification temperature of the material forming the body, applying unidirectional pressure for isostatically compressing the powder vehicle within the mold against the heated body at a sufficient pressure to densify the body, the heating and compressing being increased incrementally, either at the same or different times, whereby the body is compacted to a density of from about 90 to 100%, usually 99% or higher, of theoretical density and possessing a precise final shape.

The advantage of the foregoing method is to enable the production of a high density product of complex shape by simple unidirectional hot-pressing, and the densification of bodies of ceramic and other refractory materials of complex shape which were heretofore not capable of being so densified.

BRIEF DESCRIPTION OF THE DRAWING

For a better understanding of the invention, reference is made to the drawing which is exemplary of one type of hot pressing mold assembly which may be used for the practice of the method of the present invention.

DESCRIPTION OF THE PREFERRED EMBODIMENT

In accordance with the present invention, the novel method of compacting shaped powdered objects to near theoretical density includes the steps of: 1. Preparing from a powdered material, having a given densification temperature, a preformed body or object having a configuration close to the desired shape, but having voids so that its density is substantially less than that of the desired final object; 2. Placing the preformed object within a mass composed of particles of a powder or powdered vehicle having a melting point above the densification temperatures, which powder completely surrounds the preformed object and confining this mass in a mold in a unidirectional press; such powdered vehicle should not react with the body; 3. The body and its surrounding mass of powder are subjected to an initial compression applied through the operation of the unidirectional ram or piston of the press so as to compact the powder firmly around the body, a pressure of the order of 1000 psi being adequate, also the body and powder are heated in this initial time up to a temperature of 300° C to 700° C, below the densification temperature; and 4. Applying a pressure in increments of from about 50 psi to about 1000 psi to the confined powdered vehicle while heating the powdered vehicle and the preformed object at increments of from about 50° C to about 300 ° C to its densification temperature, whereby the powdered vehicle forms a compactible mold around the object during preliminary compaction, and the incremental increases in pressure and temperature being made simultaneously or alternately, whereby a body of desired shape at nearly full density is produced.

For the purpose of this invention, the "densification temperature" is that temperature at which a given material in powder form, when subjected to a moderate pressure of the order of 1000 to 4000 psi, will attain substantially its theoretical density. An illustrative example of a test to establish the "densification temperature" is to place a quantity of the powder of the material in a mold, apply a substantial pressure through a compacting plunger, say 2000 psi, and then progressively heating the compressed material in increments of temperature rise, for example, 25° C increments, holding the material after each increment of temperature increase for 5 or 10 minutes. A sensitive micrometer is attached to the plunger to indicate its movement. Ignoring small changes in plunger movement, due to thermal expansion, etc., one will note at some temperature a rather large movement of the plunger, after which temperature there occurs no further significant movement of the plunger regardless of additional pressure or temperature increases. At the point of the large plunger movement, the powdered material will be noted to have formed a homogeneous solid body of near theoretical density and all voids and pores having disappeared. For many materials the densification temperature is approximately half way on the absolute temperature scale to the melting point of the material. The densification temperature is slightly pressure dependent, being higher at low pressures.

The first step of preparing a preformed object may be carried out by a number of methods. One method includes mixing of the powder, for example, silicon nitride, $Si_3N_4$, with water or alcohol in an amount sufficient to form a paste or slurry. The paste is then cast into a porous mold of the desired configuration somewhat larger than the final wanted shape, and allowed to dry. In order to derive more satisfactory hot-pressing capabilities in the subsequent hot-pressing step, a small amount of an additive, such as MgO or $Al_2O_3$ powder, may be mixed with the $Si_3N_4$ powder. The preferred additive for $Si_3N_4$ is MgO because it provides greater strength in the ultimate product. Moreover, an organic binder such as polyvinyl alcohol may also be mixed with the $Si_3N_4$ in order to provide a more durable initial preformed body. Such a preformed body is porous and may have a void content of from about 30 to 60%. Compressed metal powder shapes may have a void content of from 10 to 25%.

The preformed body may be prepared by another method, such as mixing powdered silicon (where $Si_3N_4$ is the final product) with an organic binder, and extruding or pressing it into a mold having the desired configuration. It is then heated in a nitrogen atmosphere at a suitable temperature, such as 1350° C, to form a porous reaction-sintered product of $Si_3N_4$. An additive may then be incorporated in the body by immersing it into a hot solution of compound, which is thermally decomposable into an oxide, such as magnesium nitrate $[Mg(NO_3)_2.6H_2O]$ at about 150° C, and after the solvent evaporates, the voids in the powdered objects are filled with $Mg(NO_3)_2.6H_2O$. In the subsequeny hot-pressing step, the $Mg(NO_3)_2.6H_2O$ decomposes to MgO, which remains as an additive in the hot-pressing step. The preformed body, prepared by this second method, has a void content of from about 15 to 30%.

Exemplary of the refractory metals and ceramics from which the body or object to be shaped to substantially density are the carbides, oxides and nitrides of tungsten, zirconium, silicon, aluminum and chromium, and suitable refractory metals are tungsten, niobium, tantalum, molybdenum, vanadium, zirconium and hafnium. Mixtures of two or more refractory ceramics or metals may be employed. Thus, thorium oxide and tungsten powders may be intermixed, shaped into a porous object and processed as herein disclosed. The term "powder" is used herein in a broad sense, denoting not only fine powders, such as 50 to 200 mesh fineness powder, but mixtures embodying larger pieces admixed with fine powder, or fibrous metals or oxides, such as a fibrous silicate or tantalum fibers admixed with powders of the same material molded into the porous object.

Where the preshaped body is composed of a metal, such as powdered tungsten, the metal particles are preliminarily pressed together with a small amount of an organic binder, such as styrene or polyvinyl alcohol, in order to hold the preformed body together prior to the hot-pressing step.

In all these cases, allowance must be made during the initial forming for the void content, the preformed object being larger than the final shape by the void proportion, though the preformed object is otherwise proportionately shaped to the final desired shape.

The hot-pressing step to densify the body is performed in a hot-pressing die or mold assembly 1, such as that shown in the drawing. Essentially, the assembly 1 comprises a heated mold 2 with a mold chamber 3, in which a plunger 4 is movable under pressure from a suitable means, such as a hydraulic press, in the direction of the arrow 5. The lower end of the chamber 3 may be closed with a member 6, which is either a relatively stationary block to close the lower end or may be an integral portion of mold 2, or is a second plunger movable in the opposite direction, as indicated by the arrow 7.

The mold 2 is preferably a cylindrical member composed of graphite or a refractory metal, designed and constructed to withstand pressure in excess of 4000 psi at the temperatures to be encountered and enclosed within an insulation filling 8, which is within a casing 9 of silica or other refractory. The entire assembly is heated by suitable heating means, such as an induction coil 10. A sighting tube 11 extends through the thermal insulation 8 and into the body of the mold 2 in order to measure the temperature, as by a radiation pyrometer, during the hot-pressing step.

A preformed object or body 12 is placed within the chamber 3 where it is retained substantially centrally thereof within a surrounding mass 13 of particles of pressure-transmitting powder or powder vehicle. The preformed body 12 has a complex external configuration such as is desired for a gas turbine blade. If an object has an axis of symmetry, this axis should be disposed along the axis of mold 2.

The powder mass 13 is composed of one or more suitable materials which are non-reactive with the material forming the body 12. In addition, the powder 13 must be relatively non-densifiable into a solid coherent mass upon heating and pressing, and should be characterized by being durable up to at least the maximum temperature and pressure to which the mold and body 12 is subjected. A suitable material having these properties is either powdered boron nitride (BN) or graphite. It has been found that for at or above 1400° or 1500° C, BN and graphite are preferred because they do not form a solid or rigid body at these temperatures and are readily removable and disintegrated and reusable after the hot-pressing operation. It has been found that the pressure-transmitting powder will transmit pressures essentially isostatically to the object. Though other powders, such as SiC and BC are readily usable as powder vehicles below about 1400° C, the preferred powder vehicle at these temperatures is BN. A controlled inert atmosphere is preferred during hot-pressing and where a graphite mold is used, a nitrogen or argon gas atmosphere should be used to prevent excessive mold oxidation. Pretreating the assembled mold 2 with object 12 surrounded by mass 13 by evacuating the gases also expedites removal of voids in the preformed body.

The preformed body 12 may be coated to provide a dense layer of a pressure-transmitting powder, and then it is embedded in a larger quantity of the same or different powder. Thus, a layer of boron nitride may be first applied, say a layer 25 to 100 mils thick, and then the coated body is embedded in a mass of graphite powder. The initial layer may be applied as a suspension in a volatile liquid, into which the body is dipped one or more times, and the liquid allowed to evaporate, thereby leaving a layer of boron nitride powder on the body. Accordingly, graphite may be the major portion of the pressure-transmitting powder providing a layer of boron nitride is first applied to a body which may be reactive with graphite.

Prior to inserting the body 12 into the chamber 3, a small amount of powder 13 is placed in the chamber so as to cover the upper end of the member 6. The body 12 is then placed substantially symmetrically or centrally with respect to the axis of chamber 3 within the chamber 3 on this base of the powder 13, the remainder of the chamber is then filled with the powder 13, which is then vibrated in place to achieve as good a dense fill of powder as is feasible to provide a compact assembly of the body 12 with the powder 13 in as close and intimate contact therewith as is reasonably possible prior to the final pressing steps. As much thickness of powder 13 is disposed between the top of the body 12 and plunger 4 as there is below it — for an object six inches long, from 1 to 2 inches of powder is present above and below the body.

During the initial stage of the final hot-pressing step, a pressure of about 1000 psi is applied at room temperature on the powder mass 13, which thereby effectively compresses and forms a firm mold around the body 12. In effect, during the preliminary compaction, the powder 13 forms a semi-rigid, compactible mold around the body prior to its full compaction. The assembly is then heated by the coil according to a temperature schedule so that the body 12 and the powder 13 are ultimately heated in increments to a temperature of from 1700° C to about 1750° C, and they are subjected to a gradually increasing pressure to about 4000 psi and held at the maxima for a period of, for example, about one hour. As will be set forth, the pressure and temperature both are increased in accordance with various schedules. Thereafter, the pressure is released and the assembly is cooled to room temperature, whereupon the densified body 12 is removed from the chamber 3. The powder 13 may have been pressed into a rigid mass and needs to be removed by moderately forceful means. Any adhering on the surface of the body 12 is readily removed manually, or by vibrating it or by scraping off the powder with a tool or blade. The mass 13 will usually readily separate and disintegrate into a powder. In some cases, a high pressure water jet can be applied to remove powder mass 13.

More specifically, during the preliminary stages of the pressing step of $B_3N_4$, the temperature is increased over a period of about ½ hour from about 1000° C up to 1300° C and the pressure may be increased concurrently from the initial 1000 psi to about 2000 psi, but substantially no major densification occurs within the body 12. During this time, it has been discovered that the pressure is distributed isostatically over the entire surface of the object through the powder 13. To secure the best isostatic pressing, it is desirable that the ratio between the diameter of the chamber 3 and the object be as large as reasonable possible in order to achieve substantially ideal isostatic pressure conditions; that is, a uniform distribution of pressure over the entire surface of the body 12. For a 1 inch diameter object, a 3 inh diameter cavity 3 is satisfactory, with 1 to 2 inches above and below the object 12.

During the preliminary heating, i.e., up to 1300° C, the compressed powder 13 becomes packed tightly around the body and functionally serves as a semi-rigid mold during the actual densification of the body. The mold is a result of a certain degree of cohesive bonds or cohesion between the powder particles which is especially noted with some materials, such as BN. Because of this mold effect, the essential shape of the body is retained during the subsequent compaction stage and undesired distortion of its shape is minimized. As the temperature is increased above 1300° C, the body 12 starts to densify due to the combination of such high temperature with the accompanying high pressure. Any voids or porosity begin to close and a slight flow between the powder mass 13 and the surface of the body is readily accommodated. Thereafter, at an ultimate temperature of from 1500° C to 1750° C, i.e. the densification temperature, and a pressure of 4000 psi, any remaining voids or porosities disappear almost completely until the object has a density of substantially 90% of theoretical density.

From the initial load and temperature, the pressure may be increased at a slow rate continuously and concurrently with the simultaneous increase in the temperature from 1300° C to 1750° C. Alternatively, the pressure may be increased incrementally, such as from 1000 to 2000 psi while the temperature is increased to 1600° C, then from 2000 to 3000 psi and to 1650° C, and finally from 3000 to 4000 psi while the temperature increases to about 1700° to 1750° C.

For preparing shaped members of many refractory ceramics and metals, the pressure and temperature, or both, are increased incrementally. Suitable increments are 50° to 300° C for the temperature, and 50 to 1000 psi for the pressure. A brief holding, say for a few minutes, after each increment is applied, gives an opportunity for isostatic equilization of the pressures from the mass 13 to the object 12. The increments of increasing pressure and temperature need not be a series of abrupt rises to a holding plateau, but can be slow progressive increases which may have a short dwell before the next increment is applied. Some of the pressure and temperature increments may be applied separately. Since heating usually causes a slow rise in temperature, while pressure can be increased rather rapidly in increments of 500 to 1000 psi, heating above 1000° C can be at a nearly continuous slow rate over a period of, say, 30 minutes to two hours in proceeding from 1000° to 1700° C, while the pressure can be increased in 500 or 1000 psi jumps every 10 minutes to 30 minutes.

The foregoing temperature and pressure schedule is suggested primarily for $Si_3N_4$ and it should be understood that for other materials other proportionate hot-pressing schedules may be more appropriate. In Table I is a list of some other materials together with the range of temperatures of densification that have been established. The pressures used have varied from 1000 psi up to 10,000 psi with the lower pressures associated with the upper temperature ranges. Particle size and additives moderately affect the densification temperature, so a range of temperatures is given in this Table.

TABLE I

| MgO | 900° C | – 1400° C |
|---|---|---|
| $Al_2O_3$ | 1300 | – 1600 |
| SiC | 2100 | – 2350 |
| $UO_2$ | 1200 | – 1600 |
| Pb | 200 | |
| Sn | 23 | |

Pb and Sn are usually not hot-pressed, but were found to have the indicated temperatures, 200° and 23° C, respectively as the lower starting densification temperature values.

The following is exemplary of the invention:

EXAMPLE I

Pellets of $Si_3N_4$ were prepared for densification tests by first mixing $Si_3N_4$ powder with 5% of its weight of MgO powder. No binder was added. The mixture of $Si_3N_4$ and MgO was compressed to make four pellets having a diameter of ½ inch and a height of ½ inch, and one pellet each was used for each of the four Schedule procedures shown in the Table II.

Two preformed specimens of air turbine blades were made by mixing silicon metal powder with 2% MgO powder and no binder, and then reacted by heating in nitrogen gas at 1350° C to form $Si_3N_4$. Two preforms in the shape of air turbine blades comprising reaction sintered $Si_3N_4$ (70% dense) were immersed in a solution of $Mg(NO_3)_2.6H_2O$ at 150° C (boiling temperature) to add MgO to the $Si_3N_4$. The resulting percentage of MgO added to the blade preforms is 2% by weight.

The several specimens including the four pellets and the two preforms of an air turbine blade were then hot pressed individually in a mold and furnace assembly similar to that described above and shown in the drawing. For the experiments a vehicle of powdered boron nitride was vibrated around each specimen within a graphite cylindrical mold having an inside cavity diameter of 2 inches. Each specimen was then hot pressed according to the Schedules I, II, III and IV as shown below in Table II. The powders and specimens were evacuated after the embedding step and prior to the compression and heating.

TABLE II

DENSITY VALUES OF $Si_3N_4$ SPECIMENS BEFORE AND AFTER HOT PRESSURE ACCORDING TO SCHEDULES INDICATED

| Schedule | Type of Specimen | % of Theoretical Density | |
|---|---|---|---|
| | | Before | After |
| I | Pellet | 50 | 85 |
| II | Pellet | 50 | 94 |
| III | Pellet | 50 | 80 |
| IV | Pellet | 50 | 99 |
| IV | Blade | 70 | 99 |
| IV | Blade | 70 | 99 |

Schedule I involved the hot pressing of the pellet at a pressure of 4000 psi applied when the temperature reached 1700° C where it was held for a period of ½ hour and then cooled to room temperature. From the Table it is evident that the pellet achieved a final density of 85% of the theoretical density as a result of the Schedule I treatment.

Schedule II involved the application of the pressure of 4000 psi when the pellet reached the temperature of 1750° where it was held for ½ hour and then cooled to room temperature. By that treatment, the tested pellet achieved a density of 94% of the theoretical density.

Schedule III involved a more complex pressure temperature treatment, whereby a pressure of 4000 psi was applied at room temperature and then released. Thereafter, both temperature and pressure were increased so that a pressure of 1000 lbs. was applied at 1300° C; 2000 psi applied at 1400° C; 3000 psi applied at 1550° C; and 4000 psi applied at 1600° C. The temperature was increased to 1750° C at this pressure. The pellet was then cooled to room temperature. As a result of this schedule, it is evident that a density of only 80% of the theoretical density was achieved which is considerably less than the density values achieved for the other schedules and is due to the improper application of pressure, particularly applying the full pressure initially and over the densification temperature range, namely, no pressure change as the temperature went from 1600° C and up.

Schedule IV involved the application of a pressure of 1000 psi at 1600° C; 2000 psi at 1650° C; 3000 psi at 1700° C; and 4000 psi at 1750° C, where it was held for ½ hour and then cooled to room temperature. The initial specimen tested by this procedure was a ½ inch pellet, similar to the pellet tested for Schedule I, II and III. When the density of 99% of the theoretical density was realized, specimens simulating the air turbine blade were similar tested, whereby their densities were raised from 70 to 99 percent, the latter of which corresponded to the initial pellet tested.

EXAMPLE II

Pure fine $Al_2O_3$ powder was slip cast into a turbine blade and dried. The dried slip casting was placed in a mold and embedded in fine graphite powder and heated to 1000° C and 1000 psi pressure applied, then the temperature was increased to 1300° C and the pressure was concurrently raised to 2000 psi, then 1350° C with the pressure going to 3000 psi, and then heated to 1400° C with the pressure being raised to 4000 psi, at which it was for 1¼ hours. Upon cooling to room temperature, a good dense blade, greater than 97% of theoretical density was secured.

In both Example II and the last three samples in Table II, it was found that all of the dimensions, namely the vertical and the lateral dimensions, were proportionately reduced to produce the final product.

For some pressure-transmitting powders it has been found that they tend to rigidify at elevated temperatures when a steady load has been applied; in other words, they fail to act like a fluid would. In order to secure isostatic transmission of pressure to the body, it has been found that if such condition occurs, an incremental increase of pressure of the order of 1000 psi will usually break the rigidified powder so that it will transmit the full pressure to the body.

With regard to the foregoing experiment of Schedule III in Example I, it was initially thought that the powder vehicle would continually transfer the full pressure to the object placed within it during the complete hot-pressing run. This did not occur in practice. It was found that the powder vehicle compacted when the pressure was applied at room temperature. As the temperature was raised, the compacted powder vehicle densified further, but at a very slow rate. At the temperature where the $Si_3N_4$ object started to densify (between 1600–1750° C), the boron nitride powder vehicle had reached (or was quickly approaching) its terminal density and had rigidified for the given pressure and temperature that was exerted on it. Since the powder vehicle became a rigid mass and could not flow, it could no longer transfer the pressure to densify the $Si_3N_4$ object. Thus, since the temperature range for densifying the $Si_3N_4$ member was higher than the range for the powder vehicle, the isostatic hot-pressing Technique III was not effective. This problem was solved by the practice of Technique IV by incrementally increasing the pressure on the boron nitride powder vehicle in the temperature range where the $Si_3N_4$ densifies. In this manner, the powder vehicle continued to give without rigidifying and thus transferred pressure to the $Si_3N_4$ object within it.

Accordingly, a technique of isostatic hot-pressing is provided which can be used to densify powder compacts of any complex shape. For that purpose, it is desirable to use a non-reactive, non-densifying powder (powder vehicle) as a media for transferring uniaxial pressure to isostatic pressure that densifies a powder compacted at high temperatures. The method embodied in this invention overcomes the disadvantage of prior known methods of hot pressing which were limited to only shapes of constant cross sectional area.

What is claimed is:

1. In the method of producing a substantially fully dense shaped member of a refractory powdered material having a given densification temperature, the steps comprising:
   a. forming a shaped body from refractory powdered material said shaped body characterized by voids and being larger than, but similar to, the desired final shape of the member,
   b. surrounding the shaped body with a confined mass of a transverse diameter of at least twice that of the maximum transverse dimension of the body, of a non-reactive, non-fusible pressure-transmitting powder having a melting point above the given densification temperature of body, the shaped body being symmetrically or centrally disposed within the confined mass,
   c. applying an initial pressure undirectionally to the confined mass of pressure-transmitting powder and the body therein, and heating the body to a temperature substantially below its densification temperature,
   d. thereafter, incrementally increasing the temperature of the body until the given densification temperature is reached and concurrently incrementally increasing the unidirectional pressure to the confined pressure-transmitting powder, the pressure being isostatically transmitted to the body, whereby the voids in the body are substantially completely eliminated and the body has been compacted to the desired shape, and
   e. thereafter, cooling the shaped body and releasing the pressure, and separating the formed shaped body from the pressure-transmitting powder.

2. The method of claim 1 in which the material from which the body is formed comprises at least one material selected from the group consisting of refractory metals and ceramics.

3. The method of claim 1 in which the shaped body consists of MgO modified $Si_3N_4$ and the temperature at which the body is densified is from 1600° to 1700° C, depending upon the amount of MgO.

4. The method of claim 3 in which the shaped body consists essentially of $Si_3N_4$ and a minor amount of MgO.

5. The method of claim 1 in which the pressure-transmitting powder consists essentially of at least one material selected from the group consisting of boron nitride and graphite.

6. The method of claim 1 in which the pressure-transmitting powder is boron nitride and the body comprises a refractory ceramic and an initial pressure of the order of 1000 psi is applied and the initial temperature is about 1000° C, and thereafter a pressure of 2000 psi is applied while the temperature is increased up to about 1650° C, then a pressure of 3000 psi is applied and the temperature increased up to about 1700° C, and finally a pressure of 4000 psi is applied while the temperature increases up to about 1750° C.

7. The method of claim 1 wherein the heating and compression are done alternately in increments of from about 50° to 300° C and of from 50 psi to about 1000 psi.

8. The method of claim 1 wherein the pressure-transmitting powder initially forms a semi-rigid mold around the shaped body which mold is compactible upon subsequent increases in pressure.

* * * * *